(12) United States Patent
Hanson

(10) Patent No.: US 6,493,517 B1
(45) Date of Patent: Dec. 10, 2002

(54) INTEGRATION OF SELF-DETERMINED CONSUMABLE USAGE MODEL IN PIGMENTATION MATERIAL LOW/OUT FORECAST

(75) Inventor: Gary Hanson, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/953,023

(22) Filed: Sep. 10, 2001

(51) Int. Cl.[7] ............................................... G03G 15/00
(52) U.S. Cl. ........................................... 399/11; 399/24
(58) Field of Search ................................ 399/27, 9, 24, 399/11

(56) References Cited

U.S. PATENT DOCUMENTS

| | | |
|---|---|---|
| 5,031,050 A | 7/1991 | Chan |
| 5,140,432 A | 8/1992 | Chan |
| 5,657,390 A | 8/1997 | Elgamal et al. |
| 5,657,430 A | 8/1997 | Smith et al. |
| 5,796,422 A | 8/1998 | Hanson et al. |
| 6,032,172 A * | 2/2000 | Kutcher ...................... 709/102 |
| 6,081,900 A | 6/2000 | Subramaniam et al. |
| 6,176,566 B1 | 1/2001 | Amidei |
| 6,192,410 B1 | 2/2001 | Miller et al. |
| 2002/0082896 A1 * | 6/2002 | Inagi .............................. 705/9 |

* cited by examiner

Primary Examiner—Quana M. Grainger

(57) ABSTRACT

A method of scheduling service events for a hard copy output engine includes (i) estimating when a service event is likely to occur, (ii) estimating, from a record of past usage, when peak usage is likely to occur, (iii) determining when the service event estimate is contemporaneous with the peak usage estimate and (iv) executing a predetermined protocol when determining is indicative of contemporaneous estimates.

26 Claims, 2 Drawing Sheets

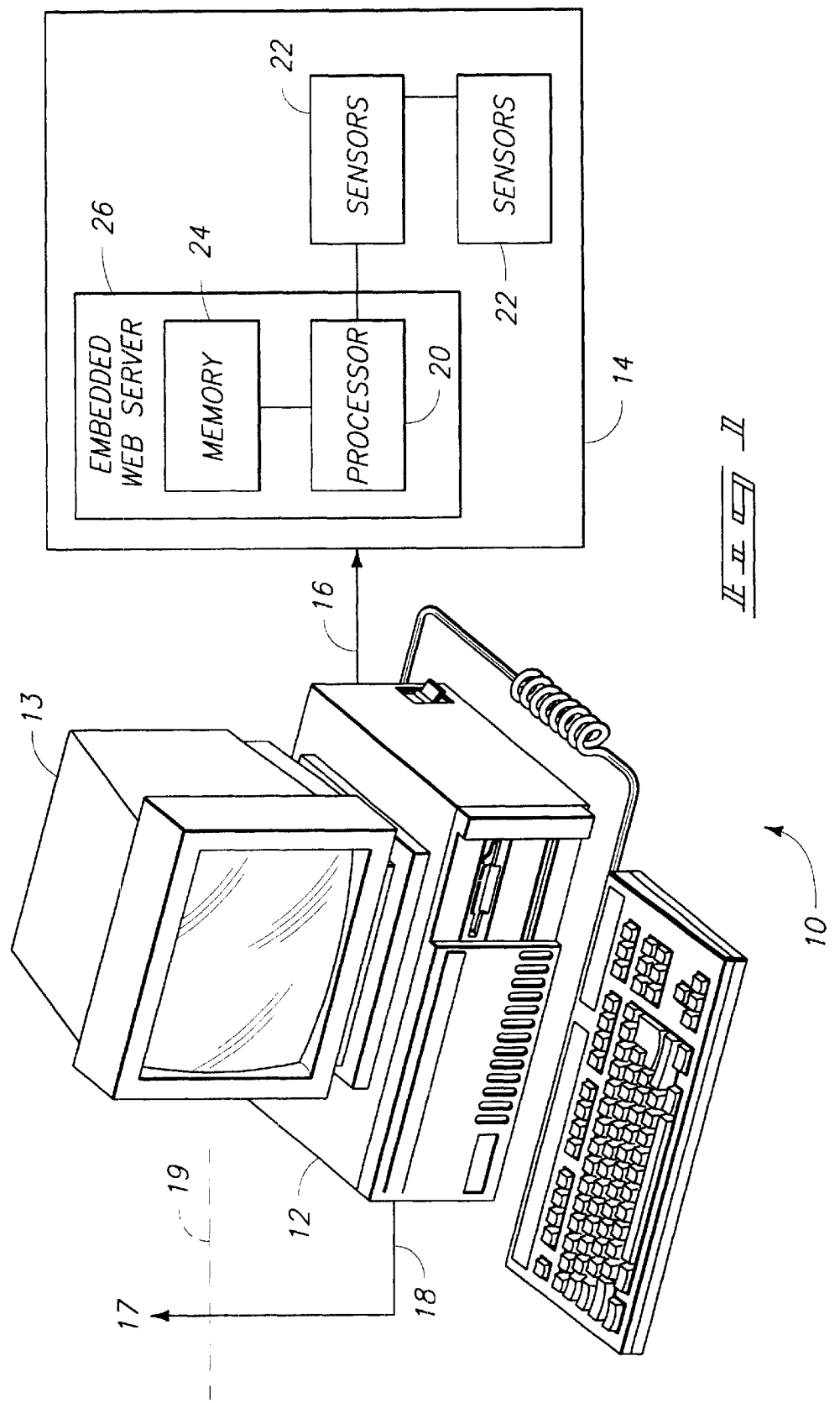

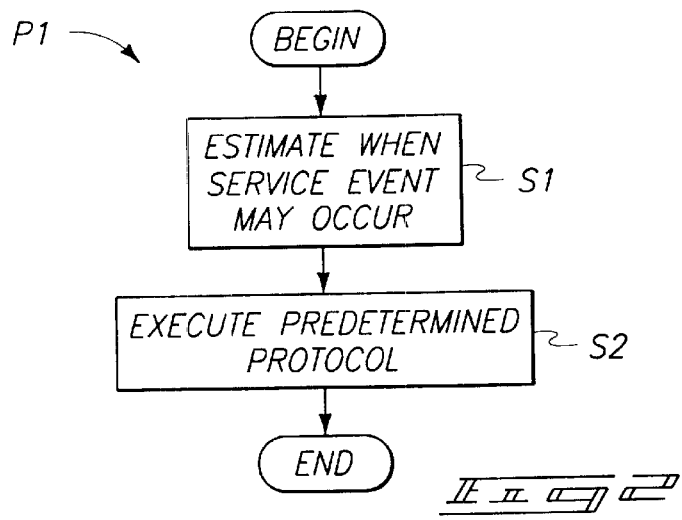
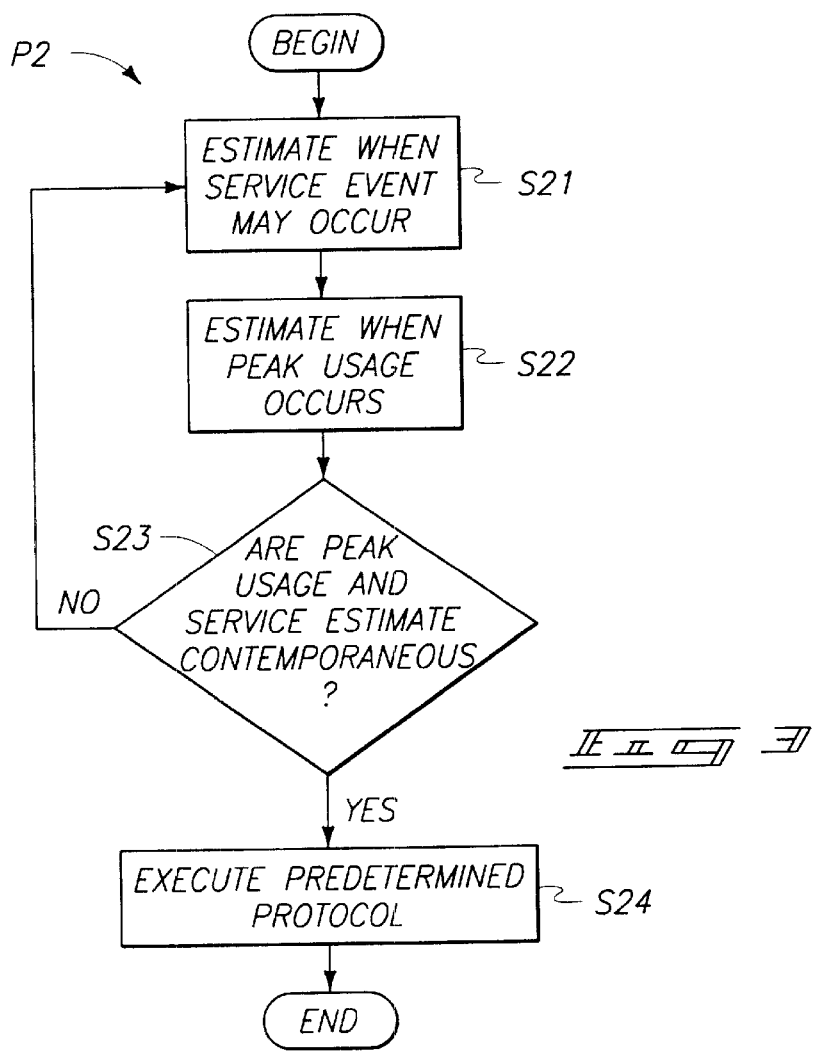

INTEGRATION OF SELF-DETERMINED CONSUMABLE USAGE MODEL IN PIGMENTATION MATERIAL LOW/OUT FORECAST

COPYRIGHT NOTICE

Contained herein is material, including material incorporated by reference, which is subject to copyright protection. The copyright owner does not object to the electronic, facsimile or electro-photographic reproduction of the patent disclosure by any person as it appears in the Patent and Trademark Office patent files or records, but otherwise reserves all rights to the copyright whatsoever.

FIELD OF THE INVENTION

The invention relates to printers and other hard copy output engines. More particularly, the invention relates to estimation of usage for a hard copy output engine and relating estimated usage to need for consumables.

BACKGROUND OF THE INVENTION

As computer systems and data communications systems have developed, the number and variety of hard copy output engines employed in a typical office or factory setting has grown. Examples include photo copiers, facsimile machines, printers and devices including more than one of these capabilities.

Additionally, increased sophistication of hard copy output engines has increased both the number and variety of consumables associated with the hard copy output engines. For example, color laser printers typically employ a plurality of toner cartridges. Some color laser printers employ at least four or more different toner cartridges. An example of such a system is described in U.S. Pat. No. 5,796,422, entitled "Direct Toner Projection Printing Using An Intermediate Transfer Medium", issued to G. Hanson et al., which is assigned to the assignee of this patent document and which is hereby incorporated herein for its teachings. Examples of laser printers using multiple toner cartridges include Models 4500, 4550, 8500 and 8550 available from the Hewlett-Packard Company of Palo Alto, Calif. One arrangement that has been employed provides separate black, cyan, magenta and yellow toner cartridges. As a result, the need to replace toner cartridges increases. Similar situations arise in conjunction with other types of printers using other types of pigmentation material, such as ink jet printers and printers employing pigmentation technologies based on phase changes.

Further, the operating parameters relevant to placement of controlled amounts of toner to achieve specific shades can be variable. Factors influencing these parameters include atmospheric humidity, ageing of components, amount of toner in the cartridge and the like. As a result, some form of feedback is highly desirable for maintaining color integrity as well as print density.

One manner in which this feedback can be supplied is to print a standard pattern periodically and to compare measurements made on the standard pattern to expected measurement values. When this process is used in a color laser printer, it may be employed at regular intervals, such as every four hours, and may take several minutes. It is generally undesirable to have this self-calibration exercise occur during a period of peak usage.

Additionally, it is generally desirable to try to anticipate when a consumable supply, such as one of the toner cartridges, may run out. Coordination of orders for supplies can be very helpful to avoid over- or under-stocking of these consumable commodities, while still achieving the benefits of economies of scale by pooling orders to service multiple hard copy output engines, especially those using at least some of the same consumable commodities. However, in many business settings, the sheer number of diverse hard copy output engines being used in different aspects or divisions of the business may lead to confusion in maintaining adequate supplies of these consumable commodities.

What is needed is a way to try to anticipate need for service events such as consumable replacement or self calibration in a manner that attempts to avoid interruption of peak usage periods.

SUMMARY OF THE INVENTION

In accordance with an aspect of the present invention, a method of scheduling service events for a hard copy output engine includes estimating when a service event is likely to occur and estimating, from a record of past usage, when peak usage is likely to occur. The method also includes determining when the service event estimate is contemporaneous with the peak usage estimate and executing a predetermined protocol when determining is indicative of contemporaneous estimates.

In accordance with another aspect of the present invention, a method of scheduling service events for a hard copy output engine includes estimating, using a record of past usage of the hard copy output engine, when a service event is likely to occur. The method also includes executing, by a processor contained in the hard copy output engine, a predetermined protocol at a time based on estimated hard copy output engine usage and estimated lead time for servicing the service event.

In accordance with another aspect of the present invention, an article of manufacture includes a computer usable medium having computer readable code embodied therein. The computer readable code is configured to cause a processor to estimate when a service event for a hard copy output engine is likely to occur and to estimate, from a record of past usage of the hard copy output engine, when peak usage is likely to occur. The computer readable code is also configured to cause the processor to determine when the service event estimate is contemporaneous with the peak usage estimate and to execute a predetermined protocol when determining is indicative of contemporaneous estimates.

In accordance with yet another aspect of the present invention, a computer implemented control system for a hard copy output engine includes memory coupled to the hard copy output engine and configured to store data representing historical usage of the hard copy output engine. The system also includes processing circuitry coupled to the hard copy output engine and to the memory. The processing circuitry is configured to estimate when a service event is likely to occur and to estimate, from the stored historical usage data, when peak usage is likely to occur. The processing circuitry also is configured to determine when the service event estimate is contemporaneous with the peak usage estimate and to execute a predetermined protocol when the processing circuitry configured to determine determines contemporaneous estimates.

Other features and advantages of the invention will become apparent to those of ordinary skill in the art upon review of the following detailed description, claims and drawings.

DESCRIPTION OF THE DRAWINGS

FIG. 1 is a simplified block diagram of a computer network including a computer and a hard copy output engine, in accordance with an embodiment of the present invention.

FIG. 2 is a simplified flowchart illustrating a process, in accordance with an embodiment of the present invention.

FIG. 3 is a simplified flowchart illustrating a process, in accordance with an embodiment of the present invention.

DETAILED DESCRIPTION OF THE INVENTION

FIG. 1 is a simplified block diagram of a computer network 10 including a computer 12 and a hard copy output engine 14, in accordance with an embodiment of the present invention. The computer 12 is coupled to the hard copy output engine 14 via a bus 16 allowing either the computer 12 or the hard copy output engine 14 to initiate data communications with the other. In one embodiment, the hard copy output engine 14 is a device such as a printer, copier, facsimile machine or a multifunction device capable of providing two or more such functions. It will be appreciated that while FIG. 1 illustrates only a single computer 12 and a single peripheral device 14 for ease of illustration and convenience in understanding, multiple computers 12 and peripheral devices 14 may all be coupled to the bus 16.

In one embodiment, the system 10 is coupled to an external interconnection 17 via a data path 18. In one embodiment, the data path 18 includes an intranet. In one embodiment, the data path 18 includes a local area network (LAN) or wide area network (WAN). In one embodiment, the data path 18 includes access to the Internet via a firewall 19.

Security is a constant challenge for networks and computing engineers responsible for networks, and is discussed in commonly-assigned U.S. Pat. No. 6,192,410 B1, entitled "Methods And Structures For Robust, Reliable File Exchange Between Secured Systems", issued to Miller et al. and which is hereby incorporated herein by reference. In particular, and as discussed in the afore-noted patent, it is important in wide area network applications for computing systems attached to such a network to secure their resources from inappropriate, unauthorized access. The Internet is an example of a global wide area network where security measures are often critical to an ongoing business enterprise connected to the Internet. Such security measures are required to assure that unauthorized third parties, anywhere in the world, cannot gain access to sensitive materials within the enterprise via the global, publicly accessible, Internet.

Though such security measures or firewalls 19 are vital to secure each particular enterprise, their very existence creates a burden for those trying to legitimately exchange information between enterprises via such global, public networks. A user in one particular computing enterprise encounters a number of difficulties exchanging data with another user in a different computing enterprise via computer system to computer system network communication links. While the communication capability may exist, for example via the Internet, safeguards and security measures (e.g., firewalls 19) within each enterprise makes such enterprise-to-enterprise exchanges difficult—exactly as they are intended to do.

In general, such firewall 19 security measures operate at lower layers of a network communication layered model to filter out potentially harmful network data exchange. For example, the firewall 19 may permit certain protocols to be exchanged only among certain network devices known to be physically secured within the enterprise. Network devices not within the permitted scope of secured devices are not permitted to use the filtered protocols. Should such un-authorized devices attempt such communications, the firewall 19 simply discards their network data transfer requests. As a result, a vendor may not be able to initiate data communications between a database maintained by the vendor and devices that have been deployed at clients of that vendor or allied vendors.

In one embodiment, the computer 12 and the hard copy output engine 14 are capable of exchanging data via a protocol compatible with presence of other computers 12 or hard copy output engines 14 on the bus 16. In one embodiment, the computer 12 and the hard copy output engine 14 employ an object-oriented request-reply protocol supporting asynchronous printer query, control and monitor capabilities, and that is capable of documenting the requests, replies and data types supported by the protocol. In one embodiment, a protocol known as PML is used.

The term "PML" refers to Printer Management Language, which has been developed by the Hewlett-Packard Company of Palo Alto, Calif. Further description of PML can be found at http://www.hp.com or at http://www.hpdevelopersolutions.com, by entering a user name, a user selected password, and by joining a solutions provider program. More particularly, a PML Protocol Specification, Hewlett-Packard Company, Nov. 18. 1998, Revision 2.3, is available therein, and is hereby incorporated herein by reference.

One exemplary remote query language implemented within the network system is a Simple Network Management Protocol (SNMP). In such an exemplary configuration, host devices such as personal computers 12 include respective processing circuitry (not shown) operable to formulate an appropriate SNMP query or request that is addressed to one or more appropriate computer peripheral devices using a communication medium. The appropriate computer peripheral device(s) receive the query or request and provide information back to appropriate host devices or computers 12 using the communication medium. Protocols other than SNMP are utilized in other embodiments to implement communications within the system.

PML permits many applications to exchange device management information with numerous computer peripheral devices, such as image forming devices. Individual computer peripheral devices implement any conversion operations between the protocol used to exchange information with respect to computer peripheral devices (e.g., SNMP) and the internal protocol (e.g., PML) used within the respective computer peripheral devices.

In one embodiment, the data path 18 provides common gateway interface (CGI) data communication capability. In one embodiment, the data path 18 includes an email capability (e.g., simple mail transfer protocol or SMTP) for facilitating data communication. In one embodiment, the data path 18 includes a secure data path using HTTP (hyper text transfer protocol) with SSL (secure sockets layer), as is described in more detail in U.S. Pat. No. 5,657,390, entitled "Secure Socket Layer Application Program Apparatus And Method", issued to Elgamal et al. and U.S. Pat. No. 6,081,900, entitled "Secure Intranet Access", issued to Subramanian et al., which patents are hereby incorporated herein by reference for their teachings.

The hard copy output engine 14 includes a controller 20, such as a conventional microprocessor or microcontroller.

The hard copy output engine 14 also includes one or more sensors 22 coupled to the controller 20 and a memory 24 in data communication with the controller 20. In one embodiment, the memory 24 comprises conventional volatile and non-volatile memory units, such as semiconductor-based DRAM, ROM, SRAM and the like. In one embodiment, the memory 24 includes magnetic, magneto-optic or optical storage media, such as conventional disc storage or floppy disc data storage units, or memory integrated circuits or CD-ROMs or the like. In one embodiment, the hard copy output engine 14 accepts instructions as a computer instruction signal embodied in a carrier wave carrying instructions executable by the controller 20.

The sensors 22 are coupled to consumable commodities associated with the hard copy output engine 14. In one embodiment, when the sensors 22 report that a quantity of a consumable commodity (e.g., print media, paper, toner or ink) associated with the hard copy output engine 14 has decreased to below a predetermined threshold amount, or that malfunction of a dispenser of a consumable commodity exists, the controller 20 initiates a data communication ultimately intended for transmission via the data path 18. Additionally, the sensors 22 may track data such as number of sheets of media that have been printed, in order to schedule maintenance operations.

The sensors 22 are coupled to consumable commodities associated with the hard copy output engine 14. In one embodiment, the sensors 22 are capable of providing quantitative data regarding an amount of remaining consumable over at least some range.

A problem that may be encountered is that the sensors 22 may not be able to provide reliable quantitative information regarding remaining toner volume over a final portion of the life of a toner cartridge. As a result, it may not be possible to determine when a toner cartridge is likely to become exhausted during a period of peak usage, even though periods of peak usage may be predictable. In some office settings, it is necessary to produce periodic reports for mass distribution according to a schedule, and disruption of hard copy output during printing of these reports is particularly undesirable.

One solution to this potential problem is to try to improve knowledge of when consumable commodities, such as toner, are likely to run out in a given setting. This solution may be implemented in several different ways.

For example, one indication of rate of toner usage is the rate at which toner from the same cartridge has been used. By keeping a historical record of the number of pages printed per day (or other interval), average number of characters or area over which toner was applied per page and the like from a time when the toner cartridge was last replaced to the present, an estimate of usage versus time that is specific to the present context in which the hard copy output engine 14 is being used can be developed. This allows the estimate to vary with changes in usage or ownership of the hard copy output engine 14.

Alternatively, the memory 24 may be pre-programmed with data corresponding to a relatively demanding environment. As more data are collected about how the hard copy output engine 14 has been employed in the present environment, the projected user profile can be modified. This approach allows an initial worst-case estimation to be replaced over time with estimates that more closely correspond to the actual usage profile appropriate to the hard copy output engine 14.

Yet another approach to estimation of end of life for a toner cartridge is to count pixels that are printed from each of the toner cartridges and to use knowledge of an estimated amount of toner per pixel to determine when a toner cartridge is likely to run out.

Dot counting is a technique originally developed in the context of ink-jet printers for estimation of an amount of ink that has been already used. Dot counting and apparatus for dot counting are described, for example, in U.S. Pat. No. 6,176,566, entitled "Cell-Based Text Enhancement For A Color Printer By Complete Excess-Color Stripping, Based On Previous Regions" and issued to Amidei; U.S. Pat. No. 5,657,430, entitled "Software-Based Procedure For Conversion Of A Scalable Font Character Bitmap To A Gray Level Bitmap" and issued to M. A. Smith et al.; U.S. Pat. No. 5,140,432, entitled "Method And System For Printing In One Or More Color Planes With Improved Control Of Error Diffusion" and issued to Chan; and U.S. Pat. No. 5,031,050, entitled "Method And System For Reproducing Monochromatic And Color Images Using Ordered Dither And Error Diffusion" and issued to Chan, which patents are assigned to the assignee of this patent document and which are hereby incorporated herein by reference for their teachings.

In one embodiment, dot counting may be performed, for example, by execution of previously-stored software instructions contained in the memory 24 via the processor 20 in response to a signal from one of the sensors 22 that a toner level has decreased below a predetermined threshold. In one embodiment, the predetermined threshold may be user-settable or user-resettable to allow sufficient time for replacement consumables to be ordered, based on knowledge of a minimum time between order placement and anticipated receipt of the replacement consumables.

Additionally, the sensors 22 may include one or more reflection densitometers configured to measure achieved toner density. The reflection densitometers allow toner density in calibration patterns printed by the hard copy output engine 14 to be measured. In turn, the processor 20 can compare the measured data from the calibration patterns to stored data. As a result, various operating bias voltages may be adjusted to modify the amount of toner that is deposited in response to input data and thus to achieve expected color gamut, dot size and image quality. Examples of such bias voltages include voltages applied to charge toner particles in a toner reservoir, voltage applied to a transfer drum or belt, voltages applied to toner modulator apertures and other voltages, some of which are described in U.S. Pat. No. 5,796,422, which is hereby incorporated herein by reference for its teachings regarding bias voltages and adjustments.

Further improvements are possible and may include comparison of previous bias values and their change over time to project a next set of probable or trial bias values prior to initiation of a calibration cycle. When the calibration cycle results in bias values that deviate by more than a predetermined threshold amount from the projected bias values, the hard copy output engine 14 may be in need of service. The processor 20 may communicate this to a responsible party via an electronic message. As a result, the hard copy output engine 14 may be serviced prior to catastrophic failure, thus providing the user with uninterrupted peak service or with more timely service, reducing down time for the hard copy output engine 14. Alternatively, the hard copy output engine 14 may incorporate knowledge of previous bias value changes to estimate new bias value settings or to update bias value settings at predetermined intervals between self-calibration events. These ideas are explored more fully hereinbelow.

In a modern electro-photographic imaging device 14 having color printing capability, it is important that the device 14 maintain color accuracy throughout its performance life. This can be a significant problem because of changes in the consumables and use environment of the device 14. Typically, this is accomplished by periodically executing, via, for example, the processor 20, sensors 22 and memory 24, an internal 'color calibration' procedure to adjust the amount of color the device 14 applies to the imaging medium.

The problem is that as the components in the imaging device 14 are consumed or age and the operating environment variables (e.g., temperature and humidity) change, the amount of pigmentation material, such as toner or ink, deposited on the imaging medium changes slightly. As a result, the color characteristics of a printed image from the imaging device 14 may change. To counteract these changes, the various voltage biases internal to the imaging device 14 can be modified to compensate for the changes.

For some hard copy output engines 14, this process includes several steps. First, a series of solid density patches for each color are created at various voltage bias levels on a test piece of imaging medium. The reflectance density is measured using sensors 22 configured as spectral photometers, as described above. The bias voltages that best correspond to a predetermined density are then chosen as a basic operating point. This is called the $D_{MAX}$ setting, and is internal to the hard copy output engine 14.

Secondly, the processor 20 operates as a formatter to generate a series of halftone patches that are measured using the same sensor 22. These are called $D_{HALF}$ patches. For each color or combination of colors, the desired spectral value is found. This value is used to generate a half tone map, which the processor 20 uses to generate a consistent tone level.

Basically, the $D_{MAX}$ setting calibrates the hard copy output engine 14 to provide correct toner deposition and $D_{HALF}$ provides information to the processor 20 to use in adjusting the images being processed. Unfortunately, this process can take several minutes and it has to be done periodically to keep the hard copy output engine 14 working correctly. Typically, the calibration process is done each time the hard copy output engine 14 is turned on and then again whenever any consumables are replaced. In most current hard copy output engines 14, this process is also executed at fixed page count increments as well.

It does not seem to matter when this process occurs, it is always seen as an inconvenience to the user. On long jobs, the hard copy output engine 14 can cease printing to calibrate itself without concern to where the end of the print job is. Each time the process occurs, there is a slight change in the colors being printed and in the hard copy output from the hard copy output engine 14.

In a sophisticated hard copy output engine 14, it is possible to keep track of the actual usage of the hard copy output engine 14 for calibration purposes. The usage parameters of interest include time of day, temperature, humidity, typical print job size, characteristic of a typical job (color usage, page coverage), number of pages per day or other temporal interval, and other pertinent information. In addition, the hard copy output engine 14 is able to record the conditions at each calibration operation and the resulting calibration values. From this, predictions may be made and automatically integrated into the operation of the hard copy output engine 14.

Ideally, the predictions could be accurate enough to continuously adjust the calibration values as the hard copy output job progresses. Unfortunately, there is a significant amount of noise in the measured data and a certain amount of variability in measurement systems. Measured data for normalized average density values for $D_{HALF}$ patches and their standard deviations show noticeable nonlinearity, even with relatively few (e.g., 13) color density values.

In order to assess past performance and usage data, a hard copy output engine 14 needs to include density sensors 22, some non-volatile memory in the memory 24, a real time clock function, firmware and processing capability, all of which can be met via the processor 20 in conjunction with the sensors 22 and memory 24, and, optionally, additional sensors 22 for monitoring of environmental variables (e.g., temperature, humidity). The complexity of the system and the data depends on the sophistication and calibration accuracy desired, and may be user-adjustable.

For example, the system could take into account the temperature. humidity and time of day that the hard copy output engine 14 is operating and anticipate the conditions for the consumables that it is using or the service events that may become due. As the day progresses, it may automatically adjust as the page count changes.

As a database is developed in the hard copy output engine 14, the ability to predict and incorporate successive incremental changes improves. Eventually, the calibration events become little more than verification points where the hard copy output engine 14 checks its most recent setting adjustment and modifies the database accordingly.

This does not eliminate hard copy output engine 14 self-calibration or color calibration. It is anticipated that whenever a new consumable supply is installed or maintenance activities are executed, the hard copy output engine 14 would require characterization and performance monitoring. Even with modern manufacturing technologies there are performance variations with nominally fungible components. A higher degree of consistency in manufacturing provides reduced need for calibration events and promotes robust system operation.

The controller 20 and the memory 24 also comprise an embedded web server 26. Embedded web server 26 refers to a web server that is completely contained within a device, such as a computer peripheral device (e.g., the hard copy output engine 14). Embedded web servers 26 are configured to provide management information about the peripheral device. An embedded web server 26 can be used to manage or manipulate individual peripheral devices, such as the hard copy output engine 14, that are present in the network 10. A web browser can be used by a network user to access an embedded web server 26 in order to obtain device status updates, perform troubleshooting operations, change device configuration settings and to link to online customer support.

The term "web browser" refers to an application that runs on a workstation or personal computer 12 within the network environment 10, that lets users view HTML documents via the Internet, to access hyperlinks and to transfer files. In operation, web browsers request information from web servers and display the information that the web servers send back. The information is organized into pages containing text, graphics, sound and animation formatted by HTML and Java® applets.

The term "web server" refers to a specialized program running on a server that supports TCP/IP protocol. Web servers enable workstations or personal computers 12 or other devices in the network 10 to access external networks such as the Internet. Web servers receive HTTP requests that browsers running on various types of computer systems send. The web server could be asked to get a text or graphics file, retrieve a ZIP file or run a program. The web server then sends the information, files or program results back to the requesting browser. Embedded web servers 26 are contained within the hard copy output engine 14 itself to provide management information about the hard copy output engine 14.

FIG. 2 is a simplified flowchart illustrating an embodiment of a process P1 for scheduling service events for the hard copy output engine 14 of FIG. 1, in accordance with an embodiment of the present invention. As used herein, the term "service event" is defined to mean an event associated with maintaining the hard copy output engine 14 in peak operating condition, and may include self-calibration events, replacement of consumables (paper, pigmentation material, photoconductive drum, transfer belt etc.) as well as reprogramming events, installation of software updates and other events that may result in temporary stoppage of hard copy output. The process P1 begins with a step S1.

In the step S1, the processor 20 estimates when a service event is likely to occur, using either a predetermined (or hypothetical) usage profile or a record of past usage of the hard copy output engine 14.

In one embodiment, the step S1 of estimating when a service event is likely to occur includes determining when a pigmentation material supply, such as a toner supply, is likely to be exhausted. In one embodiment, a pigmentation material low, such as a toner low, indicator signal from one of the sensors 22 is combined with knowledge of printer use or pigmentation material use from the cartridge or container for which the pigmentation material low signal is being provided. In one embodiment, estimating when a service event is likely to occur comprises estimating based in part on historical page count per unit time data.

In one embodiment, the step S1 includes determining, based on stored usage data, such as data from self-calibration events, when replacement of consumable components is likely to be required. In one embodiment, the step S1 is initiated by a pigmentation material level dropping below a user-settable threshold, for example as noted by one of the sensors 22. In one embodiment, estimating when a service event is likely to occur includes determining when a pigmentation material supply is likely to be exhausted. In one embodiment, estimating includes estimation based in part on historical pixel count data.

In a step S2, a predetermined protocol is executed, by the processor 20 or another microcontroller contained in the hard copy output engine 14, to schedule the service event. In one embodiment, the step S2 includes transmitting a message to initiate an order for the service event in accordance with predetermined criteria. In one embodiment, the message is an email message.

In one embodiment, the email message is sent to a preselected vendor at a time based on estimated toner usage and estimated lead time for servicing the service event. Lead times may vary according to the vendor chosen and the location of the hard copy output engine 14 relative to the service or consumables provider. Accordingly, in one embodiment, lead times are user-selectable. In one embodiment, an estimated amount of remaining consumable is used as a threshold for initiating the service event.

In one embodiment, an electronic message is automatically sent to order new pigmentation material or other consumable using simple mail transfer protocol. In one embodiment, an electronic message is automatically sent to order new pigmentation material or other consumable using hyper text transfer protocol. The process P1 then ends.

FIG. 3 is a simplified flowchart illustrating an embodiment of a process P2 for scheduling service events for the hard copy output engine 14 of FIG. 1, in accordance with an embodiment of the present invention. The process P2 begins with a step S21.

In the step S21, the processor 20 estimates when a service event is likely to occur. In one embodiment, the step S21 of estimating when a service event is likely to occur includes determining when a pigmentation material supply is likely to be exhausted.

In one embodiment, a pigmentation material low indicator signal, such as a toner low signal, from one of the sensors 22 is combined with knowledge of past printer 14 use or toner use from the cartridge for which the toner low signal is being provided. In one embodiment, the toner low signal is combined with dot counting to estimate when the toner cartridge will become exhausted.

In one embodiment, the step S21 determines when estimating when a self-calibration event is likely to occur. In one embodiment, the step S21 of estimating includes initiating estimating when a toner level drops below a user-settable threshold. In one embodiment, the step S21 is initiated by a toner level dropping below a user-settable threshold, for example as noted by one of the sensors 22. In one embodiment, estimating includes estimation based in part on historical pixel count data.

In a step S22, the processor 20 provides an estimate of when peak usage of the hard copy output engine 14 is likely to occur. In one embodiment, the estimate of when peak usage is likely to occur comprises estimating based in part on historical page count per unit time data. In one embodiment, estimating when peak usage is likely to occur includes estimating based on a record of past usage. In one embodiment, estimating when peak usage is likely to occur comprises estimating based in part on historical pixel or dot count per unit time data.

In a query task S23, the processor 20 determines when the service event estimate is contemporaneous with the peak usage estimate. When the query task S23 determines that the service event estimate is not contemporaneous with the peak usage estimate, control passes back to the step S21. When the query task S23 determines that the service event estimate is contemporaneous with the peak usage estimate, control passes to a step S24.

In the step S24, the processor 20 executes a predetermined protocol when the step S23 is indicative of contemporaneous estimates.

In one embodiment, execution of the protocol transmits a warning when it is determined that the service event estimate is contemporaneous with the peak usage estimate. In one embodiment, the warning is transmitted to a predetermined vendor to schedule a service event and to order any parts that may logically be required for the service event.

In one embodiment, the step S24 comprises initiating the self-calibration event prior to a time when the peak usage is estimated to occur when the step S23 has determined that the self-calibration event would otherwise occur during the estimated peak usage interval. In one embodiment, the step S24 comprises initiating replacement of the toner cartridge prior to a time when the peak usage is estimated to occur. The process P2 then ends.

It will be appreciated that the processes described herein promote robust usage of hard copy output engines, and reduce certain inconveniences that a user may otherwise experience. Anticipation of service events promotes greater uptime and also promotes more effective usage of uptime.

The protection sought is not to be limited to the disclosed embodiments, which are given by way of example only, but instead is to be limited only by the scope of the appended claims.

What is claimed is:

1. A method of scheduling service events for a hard copy output engine comprising:

estimating when a service event is likely to occur;

estimating, from a record of past usage, when peak usage of the hard copy output engine is likely to occur;

determining when the service event estimate is contemporaneous with the peak usage estimate; and executing a predetermined protocol when determining is indicative of contemporaneous estimates.

2. The method of claim 1, wherein estimating when a service event is likely to occur includes determining when a pigmentation material supply is likely to be exhausted and executing comprises transmitting a warning when it is determined that the service event estimate is contemporaneous with the peak usage estimate.

3. The method of claim 1, wherein estimating when a service event is likely to occur includes determining when a self-calibration event is likely to occur.

4. The method of claim 1, wherein:

estimating when a service event is likely to occur includes determining when a self-calibration event is likely to occur; and executing comprises initiating the self-calibration event prior to a time when the peak usage is estimated to occur.

5. The method of claim 1, wherein estimating when peak usage is likely to occur comprises estimating based in part on historical page count per unit time data.

6. The method of claim 1, wherein estimating when a service event is likely to occur includes estimating based in part on historical pixel count data.

7. The method of claim 1, wherein estimating when a service event is likely to occur is initiated by a pigmentation material level dropping below a user-settable threshold.

8. A method of scheduling service events for a hard copy output engine comprising:

estimating, using a record of past usage of the hard copy output engine, when a service event is likely to occur; and executing, by a processor contained in the hard copy output engine, a predetermined protocol at a time based on estimated hard copy output engine usage and estimated lead time for servicing the service event.

9. The method of claim 8, wherein estimating when a service event is likely to occur includes determining when a pigmentation material supply is likely to be exhausted and executing comprises transmitting a message to initiate an order for the service event.

10. The method of claim 8, wherein:

estimating when a service event is likely to occur includes determining when a pigmentation material supply is likely to be exhausted, the method further comprising:

estimating, from a record of past usage, when peak usage of the hard copy output engine is likely to occur;

determining when the service event estimate is contemporaneous with the peak usage estimate; and executing comprises initiating replacement of the pigmentation material supply prior to or after a time when the peak usage is estimated to occur.

11. The method of claim 10, wherein estimating when peak usage is likely to occur comprises estimating based in part on historical page count per unit time data.

12. The method of claim 10, wherein estimating when a service event is likely to occur includes estimating based in part on historical pixel count data.

13. The method of claim 8, wherein estimating when a service event is likely to occur is initiated by a pigmentation material level dropping below a user-settable threshold.

14. An article of manufacture comprising a computer usable medium having computer readable code embodied therein that is configured to cause a processor to:

estimate when a service event for a hard copy output engine is likely to occur;

estimate, from a record of past usage of the hard copy output engine, when peak usage of the hard copy output engine is likely to occur;

determine when the service event estimate is contemporaneous with the peak usage estimate; and execute a predetermined protocol when determining is indicative of contemporaneous estimates.

15. The article of manufacture of claim 14, wherein the computer readable code configured to cause the processor to estimate when a service event is likely to occur includes computer readable code configured to cause the processor to determine when a pigmentation material supply is likely to be exhausted and wherein the computer readable code configured to cause the processor to execute comprises computer readable code configured to cause the processor to transmit a warning when the computer readable code configured to cause the processor to determine determines that the service event estimate is contemporaneous with the peak usage estimate.

16. The article of manufacture of claim 14, wherein the computer readable code configured to cause the processor to estimate when a service event is likely to occur includes computer readable code configured to cause the processor to determine when a self-calibration event is likely to occur.

17. The article of manufacture of claim 14, wherein the computer readable code configured to cause the processor to estimate when a service event is likely to occur includes computer readable code configured to cause the processor to determine when a self-calibration event is likely to occur and wherein the computer readable code configured to cause the processor to execute comprises computer readable code configured to cause the processor to initiate the self-calibration event prior to a time when the peak usage is estimated to occur.

18. The article of manufacture of claim 14, wherein the computer readable code configured to cause the processor to estimate when peak usage is likely to occur includes computer readable code configured to cause the processor to estimate when peak usage is likely to occur based in part on historical page count per unit time data.

19. The article of manufacture of claim 14, wherein the computer readable code configured to cause the processor to estimate when a service event is likely to occur includes computer readable code configured to cause the processor to includes estimate when a service event is likely to occur based in part on historical pixel count data.

20. The article of manufacture of claim 14, wherein the computer readable code configured to cause the processor to estimate when a service event is likely to occur includes computer readable code configured to cause the processor to determine when a pigmentation material level drops below a user-settable threshold.

21. A computer implemented control system for a hard copy output engine, the system comprising:

memory coupled to the hard copy output engine and configured to store historical usage data for the hard copy output engine; and processing circuitry coupled to the hard copy output engine and to the memory, the processing circuitry being configured to:

estimate when a service event is likely to occur;

estimate, from the stored historical usage data, when peak usage of the hard copy output engine is likely to occur;

determine when the service event estimate is contemporaneous with the peak usage estimate; and execute a predetermined protocol when the processing circuitry configured to determine determines contemporaneous estimates.

22. The computer implemented control system of claim 21, wherein:

the processing circuitry configured to estimate when a service event is likely to occur includes processing circuitry configured to determine when a pigmentation material supply is likely to be exhausted; and the processing circuitry configured to execute comprises processing circuitry configured to transmit a warning when the processing circuitry configured to determine determines that the service event estimate is contemporaneous with the peak usage estimate.

23. The computer implemented control system of claim 21, wherein the processing circuitry configured to estimate when a service event is likely to occur includes processing circuitry configured to determine when a self-calibration event is likely to occur.

24. The computer implemented control system of claim 21, wherein the processing circuitry configured to estimate when peak usage is likely to occur includes processing circuitry configured to estimate when peak usage is likely to occur based in part on historical page count per unit time data.

25. The computer implemented control system of claim 21, wherein the processing circuitry configured to estimate when a service event is likely to occur includes processing circuitry configured to estimate when a service event is likely to occur based in part on historical pixel count data.

26. The computer implemented control system of claim 21, wherein the processing circuitry configured to estimate when a service event is likely to occur includes processing circuitry configured to determine when a pigmentation material level drops below a user-settable threshold.

* * * * *